Figure 1:
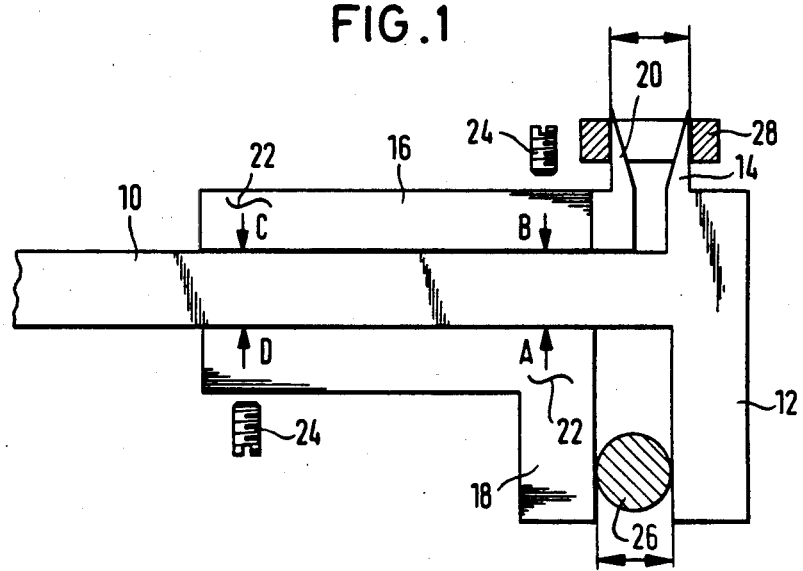

United States Patent [19]

Mathes

[11] Patent Number: 4,644,660
[45] Date of Patent: Feb. 24, 1987

[54] SLIDE GAGE
[75] Inventor: Günther Mathes, Mauren, Liechtenstein
[73] Assignee: Etablissement Sinoval, Vaduz, Fed. Rep. of Germany
[21] Appl. No.: 735,735
[22] Filed: May 20, 1985
[30] Foreign Application Priority Data May 21, 1984 [DE] Fed. Rep. of Germany ....... 3418878
Sep. 24, 1984 [DE] Fed. Rep. of Germany ....... 3434993

[51] Int. Cl.⁴ .............................................. G01B 3/20
[52] U.S. Cl. ................................................ 33/143 M
[58] Field of Search .............. 33/143 M, 143 J, 143 R

[56] References Cited
U.S. PATENT DOCUMENTS
3,266,159 8/1966 Scholl ........................... 33/143 M X
FOREIGN PATENT DOCUMENTS
3229802 2/1984 Fed. Rep. of Germany ... 33/143 M
1282392 11/1961 France ............................ 33/143 J
422981 7/1947 Italy ................................ 33/143 M Primary Examiner—William D. Martin, Jr.
Attorney, Agent, or Firm—Cushman, Darby & Cushman

[57] ABSTRACT

In a slide gage, a slide (16) is guided displaceably by means of four sliding elements (30, 32, 34, 36) arranged in pairs on both sides of a guide rail (10). The two sliding elements (32, 36) located diagonally opposite one another and absorbing the torque transmitted to the slide (16) by a measuring leg (18) during a measuring operation are supported rigidly on the slide, while the remaining two sliding elements (30, 34) are supported resiliently on the slide. This guarantees both a high measuring accuracy and easy movability of the slide (16) on the guide rail (10).

14 Claims, 5 Drawing Figures

SLIDE GAGE

The invention relates to a slide gage with a guide rail provided at one end with a measuring leg, a slide displaceable on the guide rail and having a second measuring leg, and a number of sliding elements which are arranged on the slide and which are in sliding contact with the longitudinal edges of the guide rail.

Slide gages of this type serve for carrying out accurate length measurements. To determine the outside dimension of an article to be measured, the article is introduced between the measuring legs of the slide gage and the slide is displaced until the measuring legs rest firmly against the article. The outside dimension can then be read off on a scale of the guide rail by means of a marking made on the slide.

In slide gages of this type, it is essential that, in any position of the slide, the two measuring legs are aligned exactly parallel to one another, so that the measurement result is not influenced by the particular position of the article to be measured. Consequently, the slide has to be guided on the guide rail with as little play as possible, to prevent the measuring legs from pivoting relative to one another. On the other hand, however, it should be possible to move the slide easily along the guide rail.

Slide gages are known in which, there are as sliding elements of the slide adjustable guide rules which rest over their entire length against corresponding sliding surfaces on the longitudinal edges of the guide rail. In this case, however, a high production accuracy is necessary, thus resulting in high manufacturing costs.

In other known slide gages, the sliding surface on one side of the guide rail lies directly in a corresponding guide groove in the slide, whilst on the opposite side a sliding element, for example in the form of a spring or a rule made of bronze, adjustable by means of adjusting screws is provided in the guide groove of the slide. In these embodiments, again, it is difficult to guarantee easy and yet accurate guidance, since an elastic sliding element yields as soon as a torque is exerted on the measuring legs, and since even very slight dimensional tolerances in the width of the guide rail can no longer be compensated when a rigid sliding element is used. When the sliding elements are adjusted, as becomes necessary because of the wear occurring after lengthy use, there is considerable difficulty in setting the adjusting screws so that the sliding element is pressed against the guide rail with a suitable force and at the same time exactly parallel alignment of the measuring legs is maintained.

German Offenlegungsschrift 2,310,844 has disclosed a slide gage, in which the sliding elements on one side of the guide rail are formed by two pins arranged at a distance from one another in the longitudinal direction of the guide rail. The pins are guided in the slide so as to be displaceable transversely relative to the guide rail and are connected rigidly to one another by means of a bridge, so that they can be pressed against the guide rail by means of a single adjusting screw. Since a torque is also usually exerted on the slide when the latter is displaced, uneven wear of the pins, which cannot be compensated by means of the adjusting mechanism provided, easily arises in this embodiment. Again in this embodiment, it is therefore impossible to achieve long-lasting, play-free and easy guidance of the slide.

The object on which the invention is based is to provide a slide gage of the generic type which is inexpensive to produce and in which the slide can be displaced easily, but in which high measuring accuracy is guaranteed even after lengthy use.

This object is achieved, according to the invention, because two sliding elements arranged at a distance from one another are provided on each longitudinal side of the guide rail, and because the sliding element nearer to the measuring legs is supported resiliently on the slide on the side of the guide rail on which the measuring legs project, and the sliding element at a greater distance from the legs is supported resiliently on the slide on the opposite side of the guide rail, whilst the remaining two sliding elements are supported rigidly on the slide.

Thus, according to the invention, a rigidly supported sliding element and a resiliently supported sliding element are respectively located opposite one another, so that tolerances in the width of the guide rail are compensated and easy displaceability of the slide along the guide rail is guaranteed. The elastically supported sliding elements engage on the guide rail in different longitudinal positions and therefore exert on the slide a torque, by means of which the rigidly supported sliding elements of the slide are pressed against the guide rail and the measuring legs are always held exactly in the parallel position. A torque occurs in the same direction when, during a measuring operation, the two measuring legs are pressed against an article to be measured.

In this position, the torque exerted on the slide is absorbed by the rigidly supported sliding elements. Consequently, during measurement, the measuring edges of the two measuring legs are at exactly the same distance from one another at each point, thus preventing any falsification of the measurement result.

Since the friction occurring during the sliding movement of the slide on the sliding elements is relatively slight and the frictional force is distributed uniformly over the sliding elements, only slight wear of the rigidly supported sliding elements takes place, so that the measuring accuracy is not impaired even after lengthy use.

The rigid sliding elements are preferably adjustable by means of adjusting screws. To improve the slidability and further reduce the wear, the sliding elements are advantageously made of plastic.

The sliding elements arranged on the same side of the guide rail can be connected to one another by means of a plate. This makes it easier to assemble the sliding elements. A locking screw for fixing the slide on the guide rail is advantageously arranged in such a way that the end of the locking screw does not engage directly on the guide rail, but on one of the plates and, whilst deflecting the latter, clamps it against the guide rail. This prevents damage to the sliding surfaces of the guide rail and also prevents the slide from shifting when the locking screw is tightened, as a result of the friction occurring on the end face of the screw.

The invention can also be used on slide gages which have on the side opposite the measuring legs for measuring the outside dimension, a further pair of measuring legs for measuring inside dimensions.

Preferred exemplary embodiments of the invention are explained in more detail below with reference to the drawings.

Figure 2:
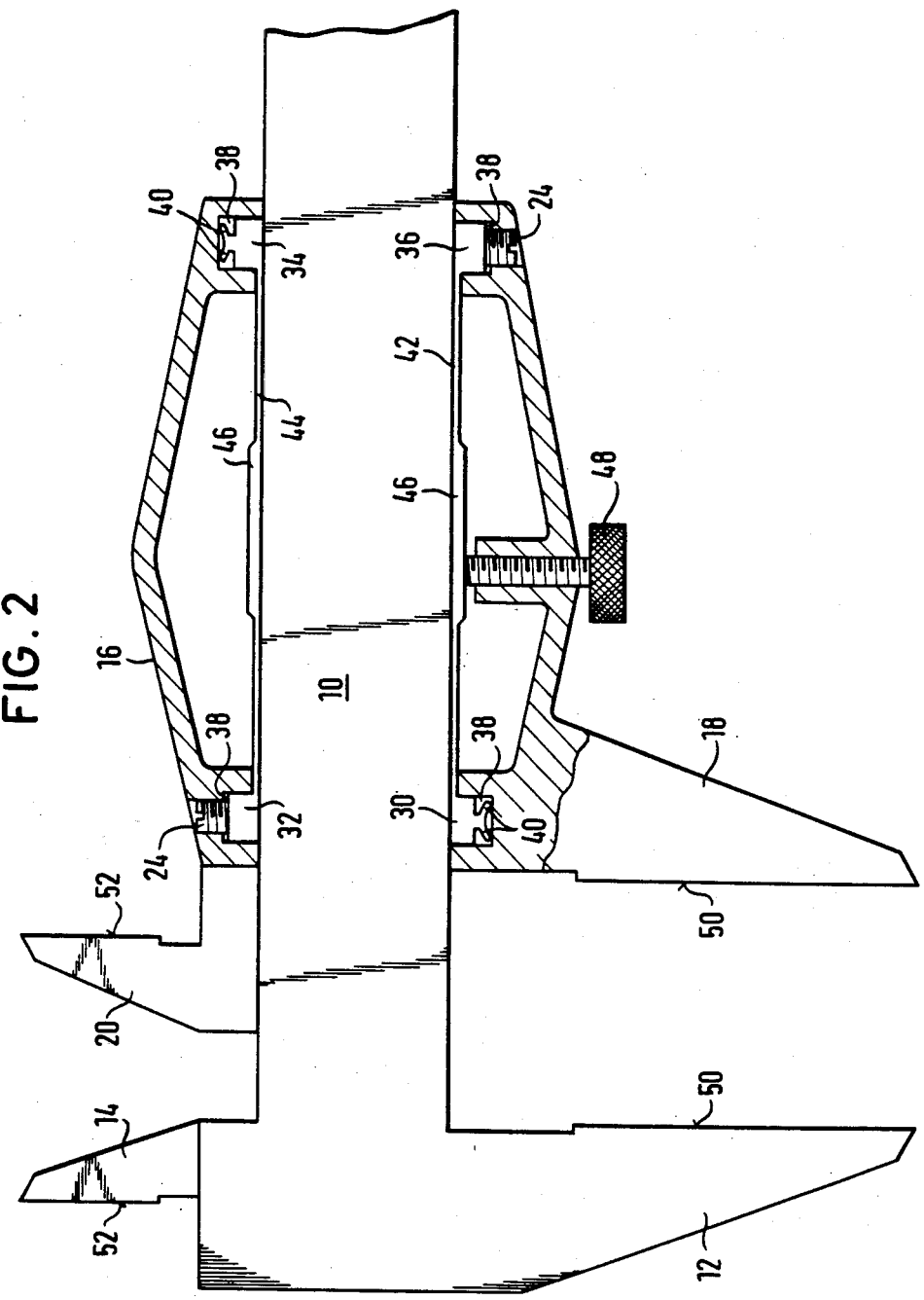
Figure 3:
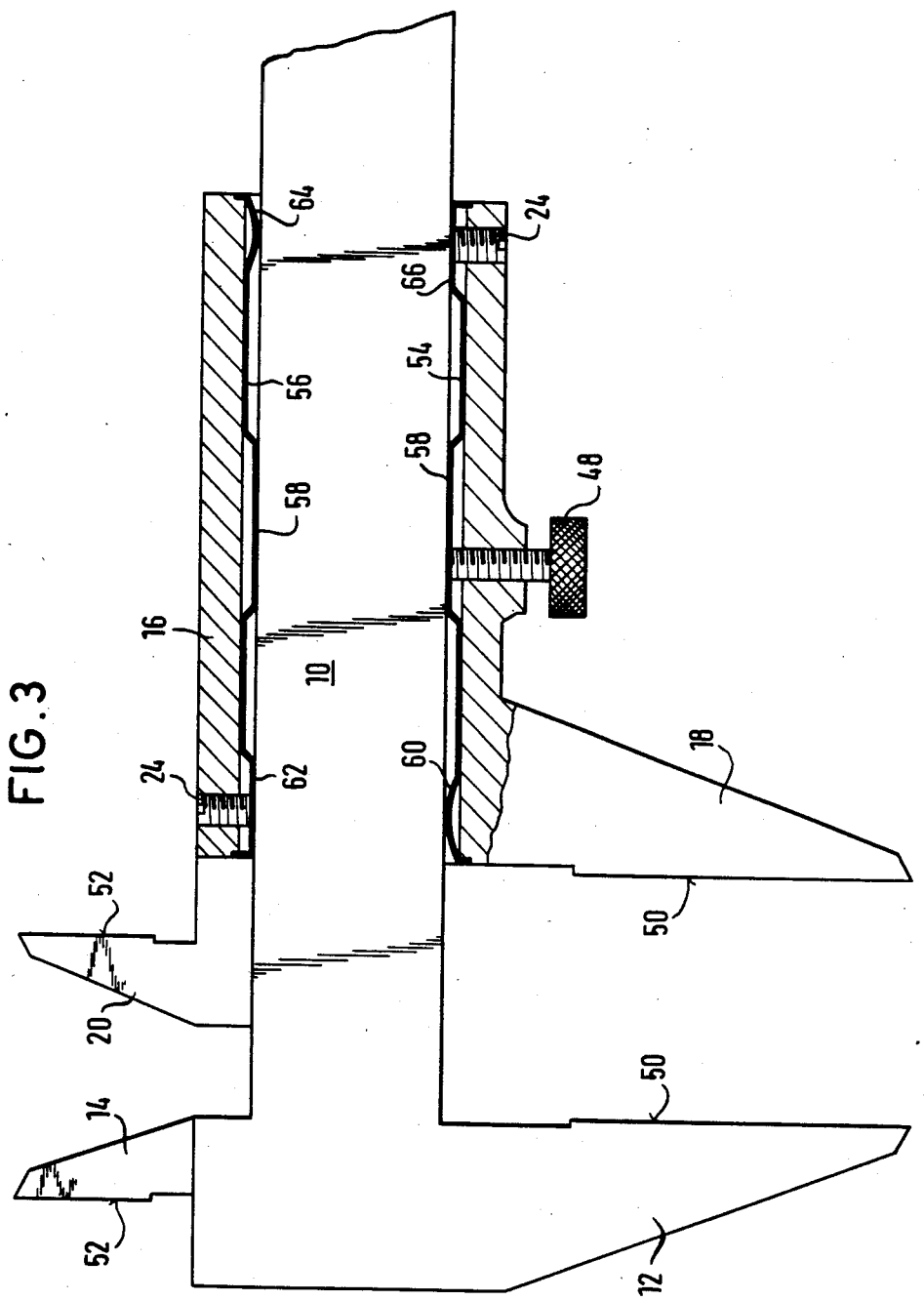
Figure 4:
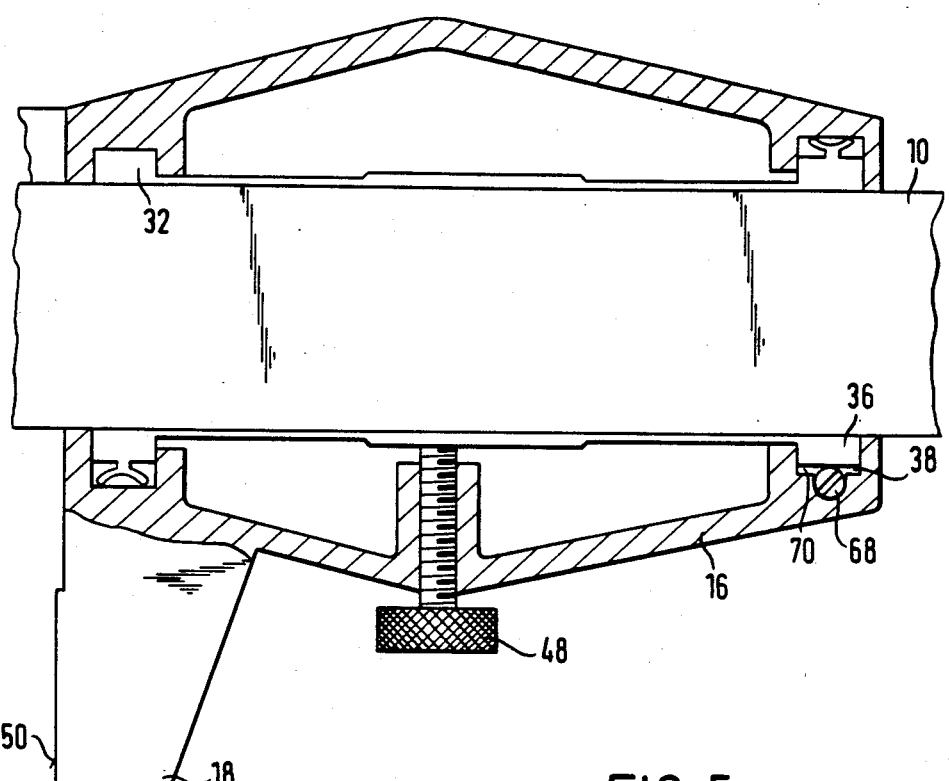
Figure 5:
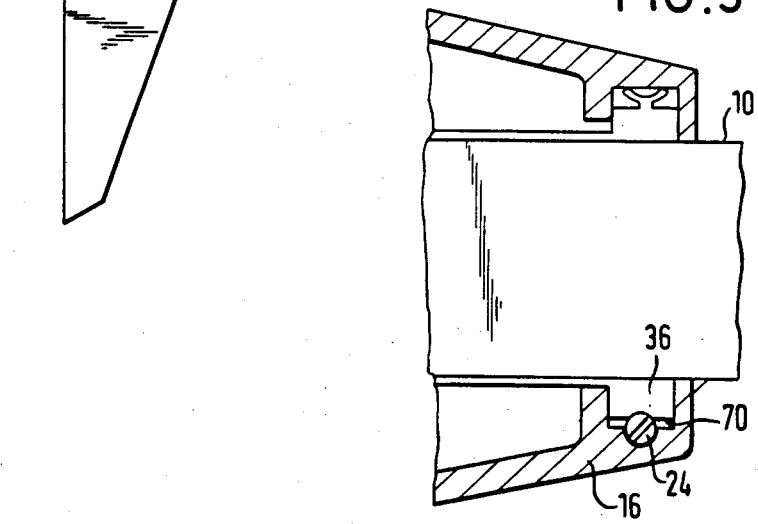

FIG. 1 is a diagrammatic representation of a slide gage according to the invention;

FIGS. 2 and 3 each show an exemplary embodiment of a slide gage according to the invention;

FIGS. 4 and 5 are part views of the exemplary embodiment according to FIG. 2 and show modified mechanisms for adjusting the measuring slide.

According to FIG. 1, a slide gage according to the invention incorporates a guide rail 10 which is provided at one end with an outside-dimension measuring leg 12 projecting on one side and with a smaller inside-dimension measuring leg 14 projecting on the opposite side. A slide 16 is guided so as to be slidable along the guide rail 10 and has an outside-dimension measuring leg 18 extending parallel to the measuring leg 12, and an inside-dimension measuring leg 20 extending parallel to the measuring leg 14.

By means of sliding elements not shown in FIG. 1, which are fixed on the slide 16 and which are in sliding contact with the narrow sides of the guide rail 10, the slide 16 is guided at four points A, B, C and D. According to the invention, the sliding elements are supported elastically at the points A and C located diagonally opposite one another, as indicated by springs 22 shown diagrammatically. In contrast to this, the sliding elements are supported rigidly at the points B and D, as symbolized by adjusting screws 24.

When the outside dimension of a body 26 is measured by means of the measuring legs 12, 18 or the inside dimension of a hollow body 28 is measured by means of the measuring legs 14, 20, the counterforces exerted on the measuring legs by the body to be measured generate a torque which tends to rotate the slide 16 in a clockwise direction in FIG. 1 in relation to the guide rail 10. The rigid support of the sliding members at the points B and D counteracts this torque and guarantees an exactly parallel alignment of the measuring edges of the measuring tongues. When the slide 16 is moved along the guide rail 10, the elastic support at the points A and C guarantees that any dimensional tolerances in the width of the guide rail 10 are compensated, and that the slide can move free of play, but easily. This not only makes it easier to handle the slide gage, but also reduces the wear on the sliding elements.

FIG. 2 shows a slide gage which is provided with sliding members 30, 32, 34, 36 made of plastic, whereas the guide rail 10 and the slide 16 consist of metal or of a plastic different from the material of the sliding elements.

The surfaces of the sliding elements 30, 32, 34, 36 facing the guide rail 10 match the respective guide profile of the guide rail 10. The sliding elements are each arranged in a rectangular recess 38 in the slide 16 and are thus secured against displacement in the longitudinal direction of the guide rail 10. The positions of the sliding elements 30, 34 correspond to the points A and C in FIG. 1. These sliding elements are each made in one piece with two tongues 40 which are arranged essentially in the form of a V and which are supported resiliently on the bottom of the recess 38. The sliding elements 32, 36 which are respectively located exactly opposite the resiliently sliding elements 30, 34 are supported rigidly on the slide 16 by means of the adjusting screws 24. The sliding elements 30, 36 and 32, 34 respectively arranged on the same side of the guide rail 10 are each connected in one piece to one another by means of a flexible plate 42 and 44. The plates each have in the center a strengthened region 46, on which a locking screw 48 engages where the plate 42 is used.

By means of the adjusting screws 24, the rigidly supported sliding elements 32 and 36 can be adjusted in a simple way, so that the measuring edges 50 and 52 of the measuring legs 12, 18 and 14, 20 respectively are aligned exactly parallel under load, during measurement. For this purpose, the adjusting screws 24 are advantageously tightened relatively firmly in a uniform manner, so that a gap opening inwards in the form of a wedge remains between the measuring edges 50, even when the measuring legs 12 and 18 are pressed firmly together. The adjusting screws 24 are then gradually slackened uniformly, until the wedge-shaped gap can close completely when the measuring legs are pressed together. The elastic support of the sliding elements 30 and 34 guarantees that the pressing force of the sliding elements remains relatively low and therefore does not need to be taken into account during adjustment.

Since only slight wear on the sliding elements occurs in a slide gage according to the invention, the adjusting screws 24 can even be omitted. In this case, the rigidly supported sliding elements 32 and 36 and the recesses 38 receiving them are advantageously undercut, so that the sliding members are fixed in the transverse direction of the guide rail 10.

Alternatively, an adjusting screw 24 can also be provided on only one of the sliding elements 32, 36.

FIG. 3 shows a modified embodiment of the invention, in which the sliding elements 60, 62, 64, 66 are formed by metal strips 54, 56. The metal strips 54, 56 are fixed at each of their two ends in a groove of the slide 16 and have a table-shaped projection at one end, to form the sliding element 62 or 66 supported rigidly by means of the adjusting screw 24, and at the other end an elastically deformable dome to form the resiliently supported sliding element 60 or 64. In the middle region, the metal strips are provided with a table-shaped projection 58 which, where the metal strip 54 is used, can be clamped against the guide rail 10 by means of the adjusting screw 48.

Insofar as the guide rail 10 and the slide 16 are made of metal, a material different from the material of the slide and of the guide rail is advantageously used for the metal strips 54, 56.

FIGS. 4 and 5 show modified exemplary embodiments of the mechanism for adjusting the slide. In these exemplary embodiments, only one of the two rigidly supproted sliding elements, namely the sliding element 36 distant from the measuring leg, is adjustable.

According to FIG. 4, to adjust the sliding element 36 there is a cam 68 which is mounted rotatably in the slide 16 and which rests by means of its peripheral edge against the side of the sliding element 36 facing away from the guide rail 10. As a result of the rotation of the cam, for example by means of a screwdriver, the gap 70 formed between the sliding element 36 and the bottom of the recess 38 can be increased or reduced. At the same time, the measuring leg 16 is pivoted relative to the guide rail 10 about the other sliding element 32 acting as a pivot. Since the lever length from the sliding element 36 to the sliding element 32 corresponds approximately to the lever length from the sliding element 32 to the free end of the measuring leg 18, the change in the width of the gap 70 corresponds essentially to the amount by which the free end of the measuring leg 18 moves towards or away from the measuring leg 12.

The eccentricity of the cam 68 is approximately 0.1 to 1.0 mm, preferably 0.2 to 0.4 mm. When, for example, the eccentricity amounts to 0.36 mm, then, during a rotation of the cam through an angle of 1°, the width of the gap 70 and consequently the width of the gap between the measuring edges 50 at the free end of the measuring legs changes one micron. It thus becomes possible to adjust the slide 16 simply and accurately, so that the measuring edges 50 of the measuring legs can be aligned exactly parallel to one another.

Because of the relatively slight eccentricity and because of the friction between the cam 68 and the sliding element 36 and the slide 16, the cam 68 is retained in a self-locking manner in the particular position set, so that there is usually no need for any locking.

According to FIG. 5, to adjust the sliding element 36 there is an adjusting screw 24 which, however, extends perpendicuarly to the plane of the slide 16, that is to say perpendicularly to the drawing plane in FIG. 5, in contrast to the adjusting screw illustrated in FIG. 2. The adjusting screw 24 passes through the gap 70 and cuts into the sliding element 36 to some extent. A slightly conical design of the adjusting screw 24, at least in the length portion resting against the sliding element 36, ensures that the width of the gap 70 can be varied by screwing in the adjusting screw 24 to a greater or lesser extent.

Thus, the exemplary embodiment according to FIG. 5 also allows a simple fine adjustment of the slide 16. A comparable effect is achieved when the adjusting device according to FIGS. 4 or 5 is arranged not on the sliding element 36, but on the sliding element 32.

I claim:

1. A slide gage with a guide rail having opposing longitudinal edges and a measuring leg at one end, a slide displaceable on the guide rail and having a second measuring leg, and a number of sliding elements which are arranged in sliding contact with the longitudinal edges of the guide rail, wherein two spaced apart sliding elements are provided on each longitudinal side of the guide rail, and wherein the sliding elements on the side of the guides rail on which the measuring legs project, nearer to the measuring legs, is supported resiliently on the slide, and the sliding elements on the opposite side of the guide rail, at a greater distance from the measuring legs, is supported resiliently on the slide, whilst the remaining two sliding elements are supported rigidly on the slide.

2. A slide gage as claimed in claim 1, wherein a further pair of measuring legs for sensing inside dimensions is provided on the side of the guide rail located opposite the first and second measuring legs.

3. A slide gage as claimed in claim 1, wherein at least one of the rigidly supported sliding elements is adjustable in the transverse direction of the guide rail by means of an adjusting screw.

4. A slide gage as claimed in claim 1, wherein the sliding elements are each fixed in a recess in the slide.

5. A slide gage as claimed in claim 1, wherein the sliding elements arranged on the same side of the guide rail are each connected to one another by means of a plate.

6. A slide gage as claimed in claim 1, wherein the sliding elements are made of plastic.

7. A slide gage as claimed in claim 6, wherein the resiliently supported sliding elements each have two elastic tongues formed in one piece and arranged in the form of a V.

8. A slide gage as claimed in claim 1, wherein the sliding elements arranged on the same side of the guide rail are each formed by a metal strip fastened to the slide and elastically deformable in the region of the resilient sliding elements.

9. A slide gage as claimed in claim 5, further including a locking screw for fixing the slide on the guide rail, wherein the locking screw presses a middle portion of the plate against the guide rail.

10. A slide gage as claimed in claim 3, wherein the adjusting screw is arranged in the slide with its axis of rotation extending perpendicularly to the plane of the slide and rests by means of a conical longitudinal portion against the side of the sliding element facing away from the guide rail.

11. A slide gage as claimed in claim 1, wherein at least one of the rigidly supported sliding elements is supported on the slide via a cam and is adjustable in the transverse direction of the guide rail as a result of the rotation of the cam.

12. A slide gage as claimed in claim 2, wherein at least one of the rigidly supported sliding elements is adjustable in the transverse direction of the guide rail by means of an adjusting screw.

13. A slide gage as claimed in claim 8, with a locking screw for fixing the slide on the guide rail, wherein the locking screw presses a middle portion of the metal strip against the guide rail.

14. A slide gage as claimed in claim 2, wherein at least one of the rigidly supported sliding elements is supported on the slide via a cam and is adjustable in the transverse direction of the guide rail as a result of the rotation of the cam.

* * * * *